(12) United States Patent
Dai

(10) Patent No.: US 10,749,364 B2
(45) Date of Patent: Aug. 18, 2020

(54) ENERGY-SAVING CHARGER CAPABLE OF AUTOMATICALLY POWERING OFF

(71) Applicant: SHENZHEN ZNKL TECHNOLOGY CO., LTD, Shenzhen (CN)

(72) Inventor: Xueshi Dai, Shenzhen (CN)

( * ) Notice: Subject to any disclaimer, the term of this patent is extended or adjusted under 35 U.S.C. 154(b) by 86 days.

(21) Appl. No.: 15/985,691

(22) Filed: May 21, 2018

(65) Prior Publication Data

US 2018/0269701 A1 Sep. 20, 2018

Related U.S. Application Data

(63) Continuation of application No. PCT/CN2016/105283, filed on Nov. 10, 2016.

(30) Foreign Application Priority Data

Nov. 20, 2015 (CN) .......................... 2015 1 0806046

(51) Int. Cl.
*H02J 7/02* (2016.01)
*H02M 3/335* (2006.01)
(Continued)

(52) U.S. Cl.
CPC ................. *H02J 7/02* (2013.01); *H02J 7/00* (2013.01); *H02J 7/0026* (2013.01);
(Continued)

(58) Field of Classification Search
CPC ...... H02J 7/00; H02J 7/02; H02J 7/022; H02J 7/0026; H02J 7/0031; H02J 7/0029;
(Continued)

(56) References Cited

U.S. PATENT DOCUMENTS 5,852,550 A * 12/1998 Majid ............... H02M 3/33523
363/21.05
5,995,384 A * 11/1999 Majid ............... H02M 3/33523
323/902
(Continued)

FOREIGN PATENT DOCUMENTS

CN 101369736 A 2/2009
CN 102437627 A 5/2012
(Continued)

OTHER PUBLICATIONS

International Search Report of PCT/CN2016/105283, dated Dec. 29, 2016.

*Primary Examiner* — Richard Isla
*Assistant Examiner* — Manuel Hernandez
(74) *Attorney, Agent, or Firm* — Erson IP (Nelson IP)

(57) ABSTRACT

An energy-saving charger capable of automatically powering off includes a bridge rectifier circuit, a switch control circuit, a high-frequency transformer, and a low-voltage output circuit that are sequentially connected. The charger further includes: an electronic switch connected in series between the bridge rectifier circuit and the switch control circuit; a low-voltage-end control detection circuit connected to the low-voltage output circuit, used for feeding back a magnitude of a current output by the charger and outputting a control signal; an isolating drive circuit connected to the low-voltage-end control detection circuit; and a power-on self-holding circuit connected to the isolating drive circuit and a control end of the electronic switch, used for controlling on and off of the electronic switch according to the isolated control signal, and providing a short-time ON level to the control end of the electronic switch at the beginning of power-on of the charger.

6 Claims, 6 Drawing Sheets

(51) Int. Cl.
*H02J 9/00* (2006.01)
*H02J 7/00* (2006.01)
*H02M 1/36* (2007.01)
*H01R 13/703* (2006.01)
*H01R 24/62* (2011.01)
*H02M 1/00* (2006.01)
*H01R 13/66* (2006.01)

(52) U.S. Cl.
CPC ............ *H02J 7/0031* (2013.01); *H02J 7/022* (2013.01); *H02J 9/005* (2013.01); *H02M 1/36* (2013.01); *H02M 3/33507* (2013.01); *H02M 3/33523* (2013.01); *H01R 13/6666* (2013.01); *H01R 13/7031* (2013.01); *H01R 24/62* (2013.01); *H02J 7/0029* (2013.01); *H02J 2207/20* (2020.01); *H02M 2001/0009* (2013.01); *H02M 2001/0032* (2013.01)

(58) Field of Classification Search
CPC .. H02J 9/005; H02J 2207/20; H02M 3/33507; H02M 3/33523; H02M 1/36; H02M 2001/0009; H02M 2001/0032; H01R 13/7031; H01R 13/6666; H01R 24/62
USPC .......................... 363/21.17; 320/107
See application file for complete search history.

(56) References Cited

U.S. PATENT DOCUMENTS

| | | | |
|---|---|---|---|
| 7,579,807 B2* | 8/2009 | Funabashi | H02J 7/0029 320/106 |
| 8,958,220 B2* | 2/2015 | Kobeda | H01H 47/00 363/74 |
| 9,030,158 B2* | 5/2015 | Wang | H02J 7/044 320/107 |
| 9,627,903 B2* | 4/2017 | Schwartz | H02J 7/0052 |
| 2006/0208699 A1* | 9/2006 | Funabashi | H02J 7/022 320/128 |
| 2012/0062182 A1* | 3/2012 | Rimdzius | H02J 7/0008 320/155 |
| 2013/0026977 A1* | 1/2013 | Pei | H02J 7/0029 320/107 |
| 2013/0207486 A1* | 8/2013 | Kobeda | H01H 47/00 307/131 |
| 2014/0320073 A1* | 10/2014 | Schwartz | H02J 7/0052 320/107 |
| 2018/0269707 A1* | 9/2018 | Dai | H01M 10/44 |

FOREIGN PATENT DOCUMENTS

| | | |
|---|---|---|
| CN | 105244981 A | 1/2016 |
| CN | 105305175 A | 2/2016 |
| CN | 105322397 A | 2/2016 |
| CN | 205104966 U | 3/2016 |
| WO | 2014156514 A1 | 10/2014 |

* cited by examiner

ENERGY-SAVING CHARGER CAPABLE OF AUTOMATICALLY POWERING OFF

CROSS-REFERENCE TO RELATED APPLICATIONS

This application is a continuation of International Patent Application No. PCT/CN2016/105283 with a filing date of Nov. 10, 2016, designating the United States, now pending, and further claims priority to Chinese Patent Application No. 201510806046.7 with a filing date of Nov. 20, 2015. The content of the aforementioned applications, including any intervening amendments thereto, are incorporated herein by reference.

TECHNICAL FIELD

The present invention relates to a charger, and in particular, to a charger for charging mobile phones and electric bicycles that is capable of automatically powering off after completion of charging so as to reduce no-load loss and meet requirements for energy saving and safe use of electricity.

BACKGROUND OF THE PRESENT INVENTION

With the development of society and constant progress of science and technology, electric bicycles and digital electronic products like mobile phones have currently become the main means of transportation and necessities in people's daily life. Such devices or products commonly use batteries for power supply, and people get used to using the tools or devices in the daytime and charging them at night, so charger devices are commonly in power-on states for a long time. Some people place charger devices in power-on standby states for several days, dozens of days, or even all year around, causing the chargers to remain in meaningless energized states for a long time, which not only wastes energy, but also accelerates the aging of the charging devices and even causes safety accidents. Besides, the devices have specific charging time, for example, the full charging time of electric bicycles is generally 8 to 10 hours, and 2 to 3 hours are generally required for charging digital electronic products like mobile phones. Due to the limitations of people's living habits and conditions, the connection between chargers and the mains cannot be cut off in time when charging is completed. Meanwhile, since the current technology is not perfect enough to completely settle the issue of automatically cutting off electrical connection between a charger and a charged device, especially cutting off electrical connection to mains lines when charging is completed, no-load loss and meanwhile potential safety hazards exist.

Electronic devices of less than 100 W such as chargers and power adapters now commonly use off-line flyback switching circuits, and the circuits convert alternating currents of 85 V to 275 V provided by a power grid into direct-current voltages required by the electronic devices. In a normal working state, the loss of a flyback switching power supply mainly includes conduction loss and switching loss as well as control circuit loss. In a standby state, since the output current of the system is nearly zero, the conduction loss can be ignored, and the switching loss and the control circuit loss become the main system standby power consumption. Referring to FIG. 2, the standby power loss existing in the present application mainly includes start loss (R201, R202), absorption loss (R203, C201), core loss (T) of a high-frequency transformer, reverse recovery loss (D301) of an output rectifier tube, drive loss (R211), and switching loss (Q201). The standby power loss is a serious waste due to the particularity of the charger, that is, restart is not needed after completion of charging in a complete charging process.

Fire accidents frequently reported in newspapers or news media that are caused by charging of electric bicycles or digital electronic products like mobile phones always remind people of the importance of charging safety. Various charging protection apparatuses or devices have continuously come onto the market. Such charging protection apparatuses or devices play a positive role in reducing charging safety accidents. However, such protection apparatuses also have the following deficiencies: 1. Human participation is required, that is, the apparatus needs to be actively turned on or started by the user for operation, for example, the apparatus can be used only when a button switch is pressed for start, so the use is inconvenient. 2. A timing apparatus, where the timing apparatus is used for manually setting a time, and power is turned off when the time expires. Since the charging time is uncertain, that is, the charging time is different if the remaining capacity of the battery is different, the timing time can solve the power-off problem only by increasing the time. 3. Since current mainstream chargers commonly use high-frequency switching power transformer circuit structures (traditional iron-core transformers have gradually exited the market), there are technical difficulties in realizing the power-off function by controlling on and off of a high-voltage end using a low voltage of an output end, especially for control using a relay. Due to the volume of the relay, the problem of product miniaturization and microminiaturization cannot be solved, and therefore, it is almost impossible to use a relay on a mobile phone charger.

SUMMARY OF PRESENT INVENTION

In order to solve the aforementioned problems in the prior art, the present invention provides an energy-saving charger capable of automatically disconnecting from the mains after completion of charging.

In order to solve the aforementioned technical problems, the technical solution provided in the present invention is to design an energy-saving charger capable of automatically powering off, including a bridge rectifier circuit, a switch control circuit, a high-frequency transformer, and a low-voltage output circuit that are sequentially connected. The charger further includes: an electronic switch connected in series between the bridge rectifier circuit and the switch control circuit, and a low-voltage-end control detection circuit, connected to the low-voltage output circuit, and used for feeding back a magnitude of a current output by the charger and outputting a control signal according to the magnitude of the output current; an isolating drive circuit, connected to the low-voltage-end control detection circuit and used for isolated feedback of the control signal; and a power-on self-holding circuit, connected to the isolating drive circuit and a control end of the electronic switch, and used for controlling on and off of the electronic switch according to the isolated control signal, and providing a short-time ON level to the control end of the electronic switch at the beginning of power-on of the charger so as to keep the electronic switch on.

The isolating drive circuit includes a photoelectric coupler, an input side of the photoelectric coupler is connected to the low-voltage-end control detection circuit, and an output side of the photoelectric coupler is connected to the power-on self-holding circuit.

The electronic switch may adopt an NMOS transistor and is connected in series in a negative output line of the bridge rectifier circuit; the power-on self-holding circuit includes a first resistor, a first capacitor, and a second resistor that are connected in series between a positive output line and the negative output line of the bridge rectifier circuit, a third resistor is connected in series between a connection point of the first resistor and the first capacitor and a collector of the photoelectric coupler, a connection point of the first capacitor and the second resistor is connected to an emitter of the photoelectric coupler and a gate of the electronic switch, and a fourth resistor and a voltage-stabilizing tube are connected in parallel between the gate and a source of the electronic switch; a restart button is connected in parallel at two ends of the first capacitor, and the restart button adopts a normally open button.

The electronic switch may also adopt a PMOS transistor and is connected in series in a positive output line of the bridge rectifier circuit; the power-on self-holding circuit includes a first resistor, a second resistor, and a first capacitor that are connected in series between the positive output line and a negative output line of the bridge rectifier circuit, a connection point of the first resistor and the second resistor is connected to a gate of the electronic switch and a collector of the photoelectric coupler, an emitter of the photoelectric coupler is connected to the negative output line of the bridge rectifier circuit through a third resistor, and a fourth resistor and a voltage-stabilizing tube are connected in parallel between the gate and a source of the electronic switch; a restart button AN is connected in parallel at two ends of the first capacitor, and the restart button adopts a normally open button.

A direct-current power source and a ground used by the low-voltage-end control detection circuit are respectively connected to an output end of the low-voltage output circuit, the low-voltage-end control detection circuit may include a current detection resistor, an amplifier, and a comparator that are connected in series in an output line of the low-voltage output circuit, two ends of the current detection resistor are respectively connected to an inverting input end and a non-inverting input end of the amplifier through a tenth resistor and an eleventh resistor, a ninth resistor is connected in series between an output end of the amplifier and the inverting input end of the amplifier, the output end of the amplifier is connected to an inverting input end of the comparator, a non-inverting input end of the comparator is connected to the direct-current power source through a seventh resistor and is connected to the ground through an eighth resistor, the direct-current power source is connected to an anode at the input side of the photoelectric coupler through a fifth resistor, and a cathode at the input side of the photoelectric coupler is connected to an output end of the comparator; an indication light is connected forwardly between the anode and the cathode of the photoelectric coupler.

A direct-current power source and a ground used by the low-voltage-end control detection circuit are connected to an output end of the low-voltage output circuit, the low-voltage-end control detection circuit may also include a voltage detection unit, a current detection unit, and a central processing unit, the direct-current power source is connected to an anode at the input side of the photoelectric coupler through a fifth resistor, and a cathode at the input side of the photoelectric coupler is connected to the central processing unit, where the voltage detection unit includes a seventh resistor and an eighth resistor that are connected between the direct-current power source and the ground, and a connection point of the seventh and eighth resistors sends a detected voltage signal to the central processing unit; the current detection unit includes a current detection resistor connected in series in an output line of the low-voltage output circuit, and two ends of the current detection resistor respectively send a detected current signal to the central processing unit through a tenth resistor and an eleventh resistor; the central processing unit judges whether charging ends according to the voltage signal and the current signal, and sends a control level for controlling on or off of the photoelectric coupler to the cathode at the input side of the photoelectric coupler.

A mechanical switch may be connected between the cathode of the photoelectric coupler and the ground, the mechanical switch is mounted in an output socket of the charger, the mechanical switch is turned off when a plug is inserted in the socket, and the mechanical switch is turned on when there is no plug in the socket.

The output socket of the charger adopts a USB female socket, the female socket includes a metal housing for packaging and having an opening in a front part, a tongue-shaped fixing seat of a plastic material mounted in the metal housing, and metal pins embedded in the fixing seat, a boss of a plastic material is provided in a rear part of the fixing seat, a recess is provided in the boss, the mechanical switch is embedded in the recess, a button portion of the switch protrudes above the metal pins from the inside of the boss, and when a USB plug is inserted into the USB female socket, a front end of the USB plug is capable of touching the button portion to trigger the mechanical switch.

The central processing unit U1 acquires a maximum safe charging current Iconstant in the constant current charging stage according to the current signal, and calculates a charging cut-off current threshold Icut-off according to Iconstant in combination with an output voltage level of the voltage signal through the formula: Icut-off=Iconstant/N, N in the formula is a charging parameter, the charging parameter has multiple values corresponding to the output voltage level, the charging parameter is stored in a storage of the central processing unit, the value of N is correspondingly called during formula calculation, the central processing unit monitors a charging current in the constant voltage stage in real time through the current detection unit, and when the charging current is lower than the charging cut-off current threshold, the photoelectric coupler is controlled to cut off after a period of delay.

As compared with the prior art, the present invention enables automatic disconnection from the mains after completion of charging, thereby eliminating no-load loss, saving electrical energy, and prolonging the service life of an electronic device, and meanwhile the present invention can provide various protection for overcurrent, overvoltage, undercharge, overcharge, and the like; and furthermore, the present invention has the advantages of compact size and low costs.

DETAILED DESCRIPTION OF PREFERRED EMBODIMENTS

In order to make the objectives, technical solutions, and advantages of the present invention more comprehensible, the present invention is described in further detail below with reference to accompanying drawings and embodiments. It should be understood that the specific embodiments described herein are only used for explaining the present invention, and not for limiting the present invention.

Figure 1:
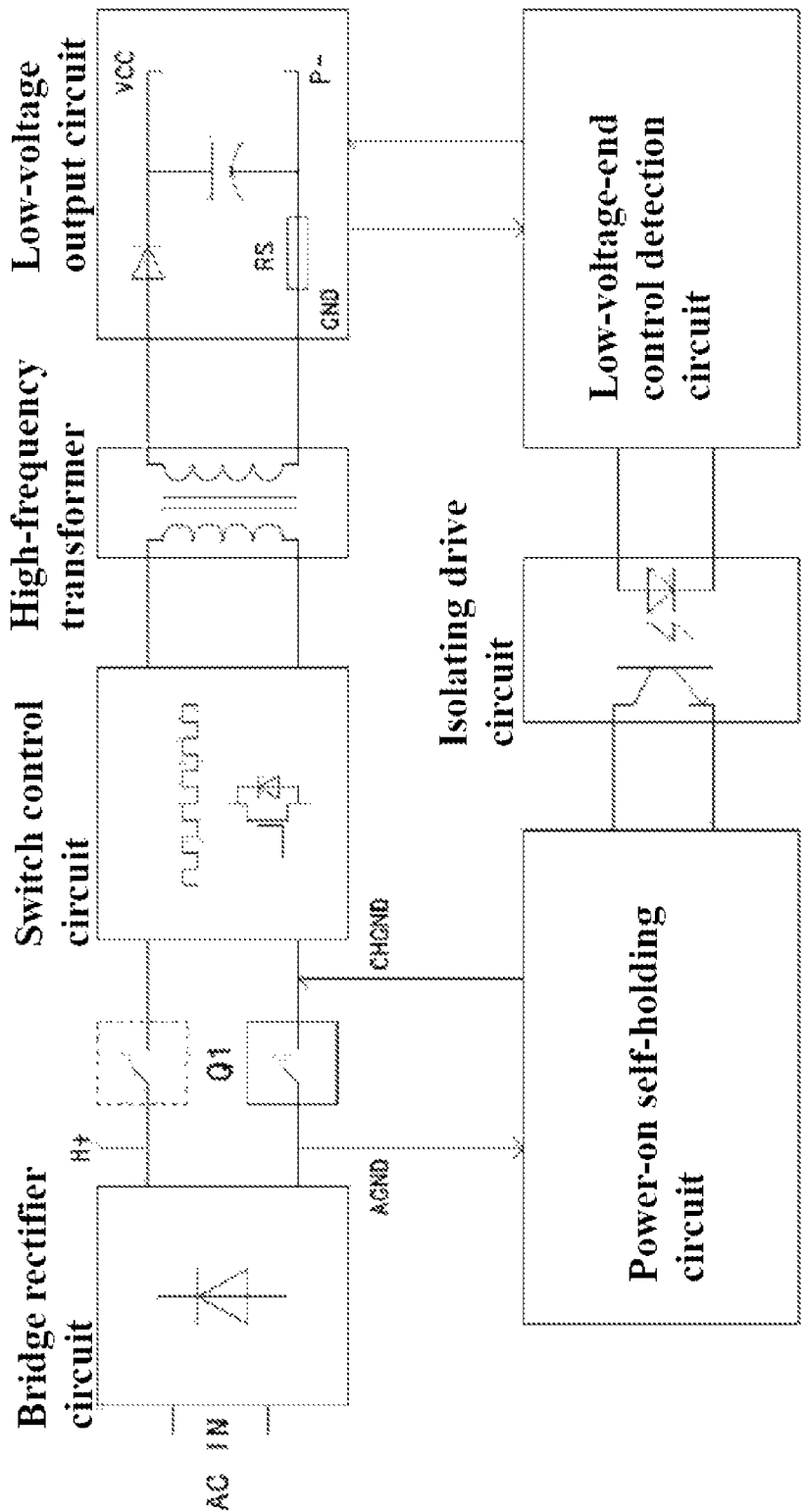
FIG. 1 is a schematic block diagram of the present invention.

Referring to the schematic block diagram shown in FIG. 1, an energy-saving charger capable of automatically powering off disclosed in the present invention includes a bridge rectifier circuit, a switch control circuit, a high-frequency transformer, and a low-voltage output circuit that are sequentially connected. The charger further includes: an electronic switch Q1 connected in series between the bridge rectifier circuit and the switch control circuit, and a low-voltage-end control detection circuit, connected to the low-voltage output circuit, and used for feeding back a magnitude of a current output by the charger and outputting a control signal according to the magnitude of the output current; an isolating drive circuit, connected to the low-voltage-end control detection circuit and used for isolated feedback of the control signal; and a power-on self-holding circuit, connected to the isolating drive circuit and a control end of the electronic switch, and used for controlling on and off of the electronic switch according to the isolated control signal, and providing a short-time ON level to the control end of the electronic switch at the beginning of power-on of the charger so as to keep the electronic switch on.

Referring to FIG. 1, at the beginning of power-on, the power-on self-holding circuit provides a short-time ON level to the electronic switch to turn on the electronic switch upon power-on, the switch control circuit and the high-frequency transformer at the rear end of the electronic switch obtain electricity, and the low-voltage output circuit at the secondary end of the high-frequency transformer outputs a direct current to a load. A current flows in the low-voltage output circuit, upon detecting the charging current, the low-voltage-end control detection circuit outputs an ON control signal, the control signal is isolated by the isolating drive circuit and then transmitted to the power-on self-holding circuit, the power-on self-holding circuit controls the electronic switch continuously on, thereby realizing self-holding, and the load gets continuously charged. When the charging is finished, upon detecting that the charging current is zero (or approximates zero), the low-voltage-end control detection circuit immediately sends a cut-off control signal, the control signal is isolated by the isolating drive circuit and then transmitted to the power-on self-holding circuit, the power-on self-holding circuit enters a power-off locked state and controls the electronic switch to cut off, the switch control circuit and the high-frequency transformer at the rear end of the electronic switch lose electricity, and further, the low-voltage output circuit and the low-voltage-end control detection circuit both lose electricity, the circuit power consumption is reduced to zero, and therefore, the standby power consumption is basically zero. In this way, the functions of saving electrical energy, prolonging the service life of a charging device, and improving electric safety are realized.

In a preferred embodiment, the isolating drive circuit includes a photoelectric coupler Q2, an input side of the photoelectric coupler is connected to the low-voltage-end control detection circuit, and an output side of the photoelectric coupler is connected to the power-on self-holding circuit.

Figure 2:
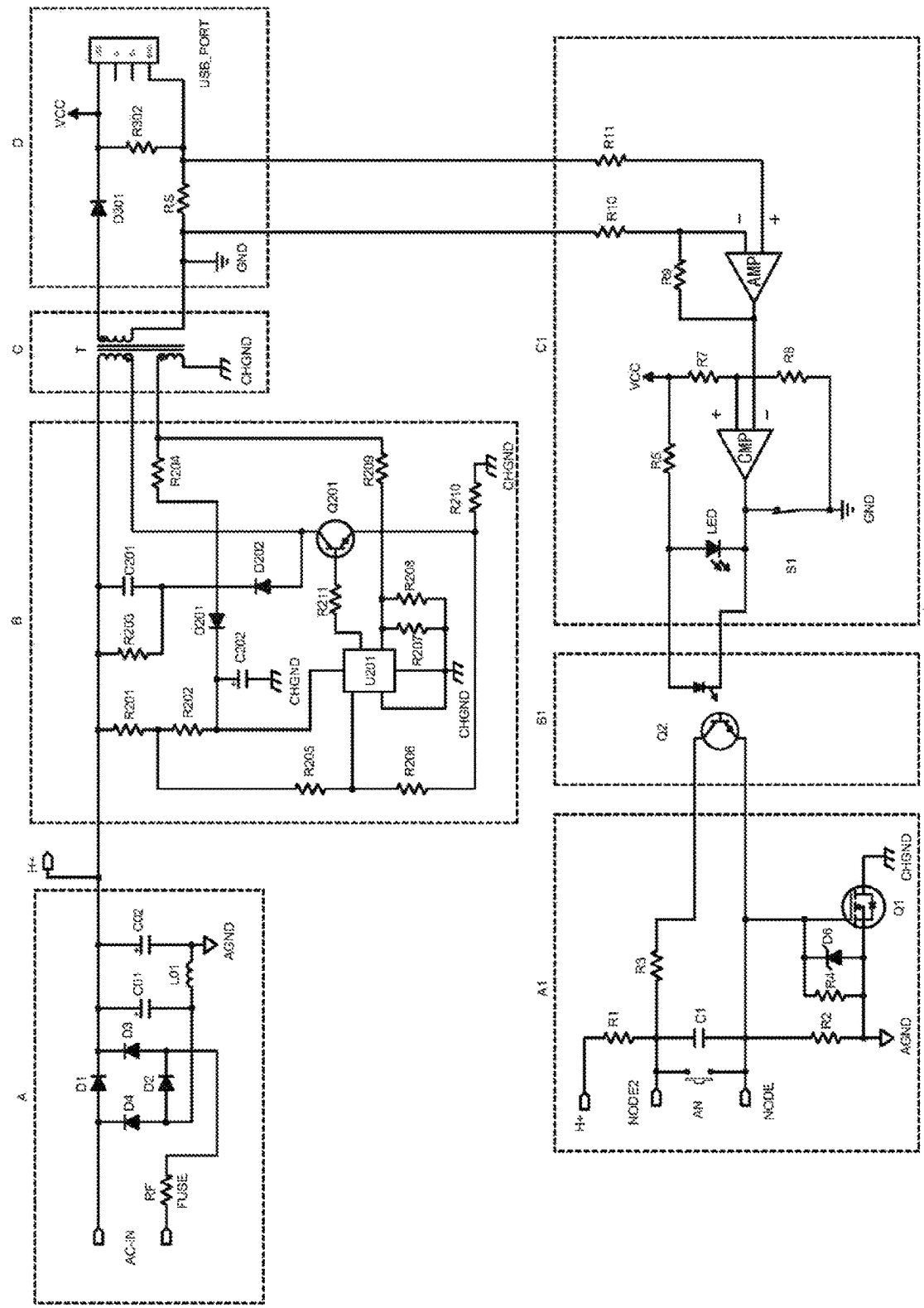
FIG. 2 is a circuit diagram illustrating that an electronic switch is connected in series in a negative output line and a low-voltage-end control detection circuit includes a comparator.

Referring to the embodiment shown in FIG. 2 (or FIG. 5), the electronic switch Q1 adopts an NMOS transistor and is connected in series in a negative output line of the bridge rectifier circuit; the power-on self-holding circuit includes a first resistor R1, a first capacitor C1, and a second resistor R2 that are connected in series between a positive output line and the negative output line of the bridge rectifier circuit, a third resistor R3 is connected in series between a connection point of the first resistor and the first capacitor and a collector of the photoelectric coupler Q2, a connection point of the first capacitor and the second resistor is connected to an emitter of the photoelectric coupler and a gate of the electronic switch, and a fourth resistor R4 and a voltage-stabilizing tube D6 are connected in parallel between the gate and a source of the electronic switch. At the beginning of power-on, according to the principle that a voltage between two ends of a capacitor cannot suddenly change, a voltage between two ends of the first capacitor C1 is 0, which is equivalent to that C1 is short-circuited, an alternating-current mains is rectified by the bridge rectifier circuit and then outputs a high-voltage direct-current voltage (the value of the high-voltage direct-current voltage is determined by the input alternating-current mains of 110 V to 220 V), the current flows through R1, C1, and R2, producing a divided voltage on a node NODE of R1 and R2, the voltage at the voltage division point is at a high level, the high level is applied to the gate of Q1, Q1 is turned on, the switch control circuit and the high-frequency transformer at the rear end of Q1 obtain electricity, the low-voltage output circuit at the secondary end of the high-frequency transformer obtains electricity and outputs a charging current, the low-voltage-end control detection circuit detects the charging current and causes the photoelectric coupler Q2 to turn on, a voltage obtained after a positive (H+) voltage of the bridge rectifier circuit is divided through R1, R3, and the output end of Q2 is applied to the gate of Q1, the system forms a self-lock, Q1 is continuously on, and the charger continuously performs charging. As time goes on, the voltage between the two ends of C1 rises to the supply voltage, the direct-current circuit is equivalently broken, the potential of the node NODE is also lowered, at this time, the potential of the gate of Q1 depends on whether the output end of Q2 is connected, that is, depends on whether there is a charging current, and since the output end of Q2 is connected, the voltage between the two ends of C1 approximates 0. When there is a charging current (charging is performed), the output end of Q2 is connected, Q1 is turned on, the system forms a self-lock, and the charger continuously works; when there is no charging current (or the charging current is small, and the charging ends), Q2 cuts off, Q1 loses the turn-on condition and cuts off, the power-on self-holding circuit enters a power-off lock function (or state), the switch control circuit, the high-frequency transformer, and the like cannot form a loop, the low-voltage output circuit loses electricity, and the current in the entire circuit is basically zero. Therefore, the standby power consumption is basically zero.

In view of the above, the power-on self-holding circuit has two working modes: a power-on self-holding mode and a power-off locked mode. 1. The power-on self-holding mode: at the beginning of power-on, the power-on self-holding circuit provides a level sufficient to turn on the electronic switch and controls the electronic switch to be in an ON mode at the same time of power-on, and the time of controlling on of the electronic switch may be set to tens of milliseconds to several seconds according to circuit requirements. 2. The power-off locked mode: the power-on self-holding working mode can only maintain a short ON time of the electronic switch, and afterwards the on and off of the electronic switch will be controlled and determined by Q2. When the output end of Q2 is controlled to be connected, the electronic switch Q1 will be continuously on, and when the output end of Q2 is controlled to be disconnected (in a high-impedance state), the electronic switch Q1 is turned off, and the power-on self-holding circuit enters the power-off locked state. Once the power-on self-holding circuit enters the power-off locked state, the circuit cannot lift the locked state by itself. Since Q2 control is at the low-voltage end, once the low-voltage end loses power, Q2 control will also fail, and therefore, the power-on self-holding circuit enters the power-off locked state.

Figure 3:
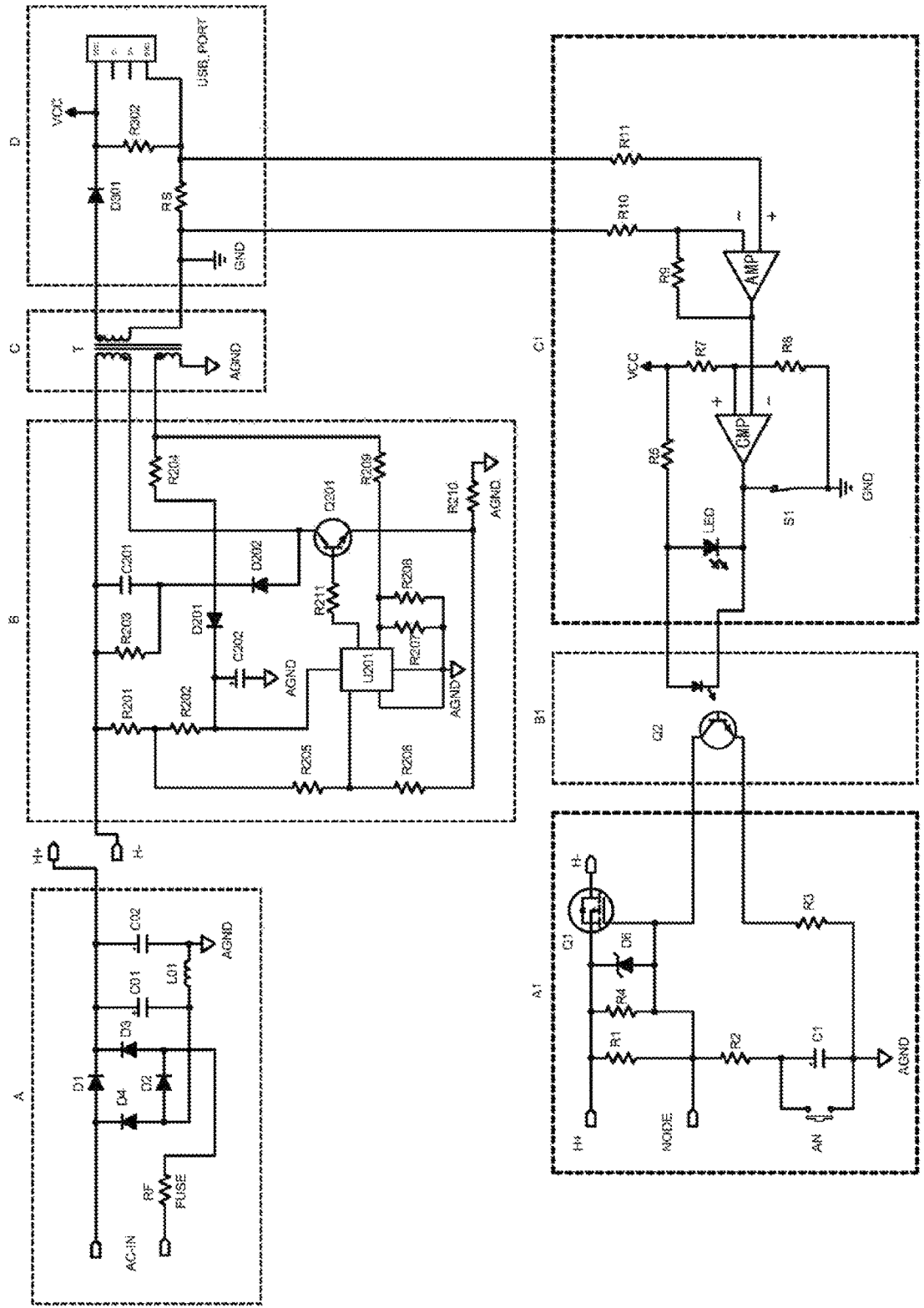
FIG. 3 is a circuit diagram illustrating that the electronic switch is connected in series in a positive output line and the low-voltage-end control detection circuit includes a comparator.
Figure 5:
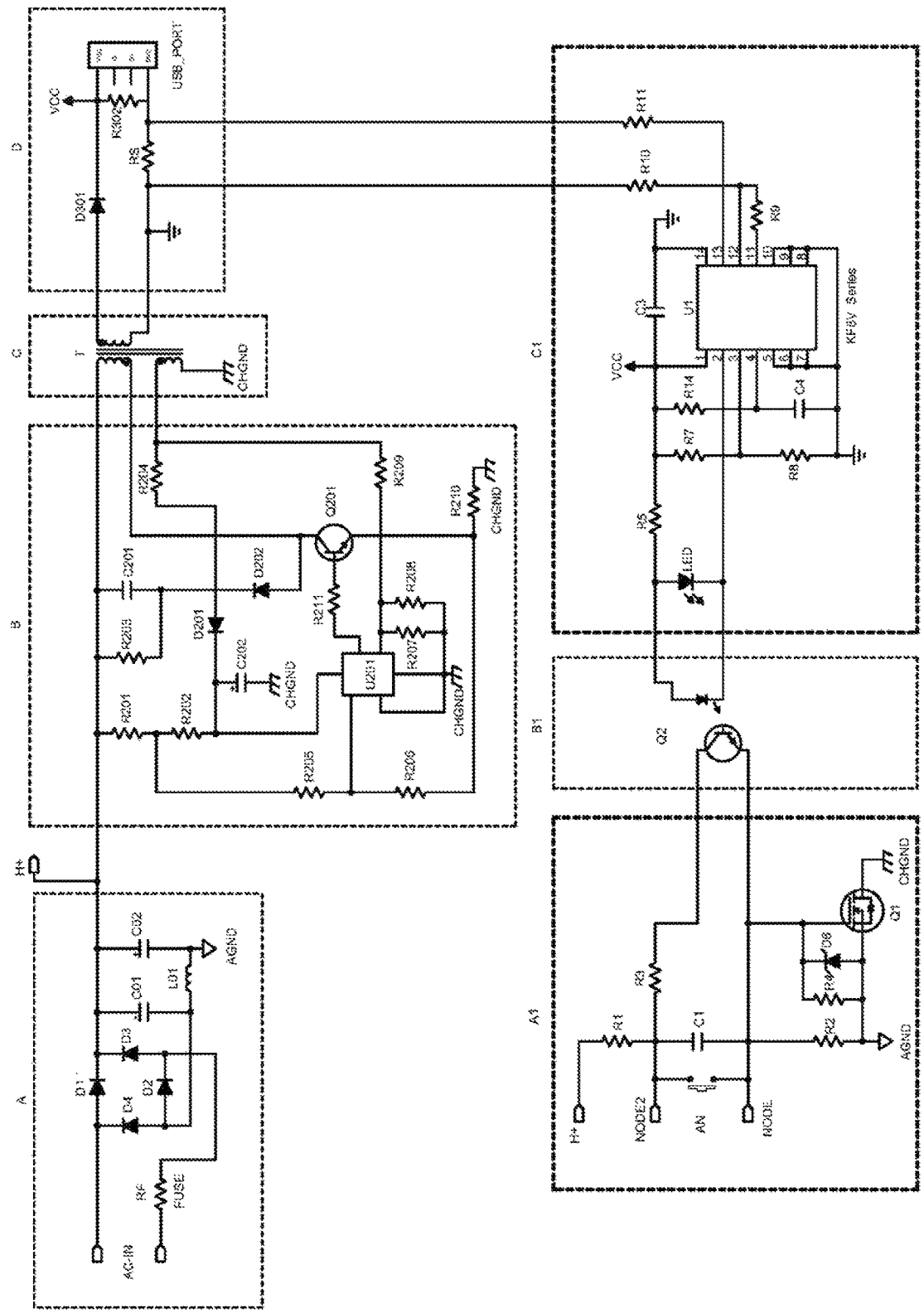
FIG. 5 is a circuit diagram illustrating that the electronic switch is connected in series in the negative output line and the low-voltage-end control detection circuit includes a central processing unit.
Figure 6:
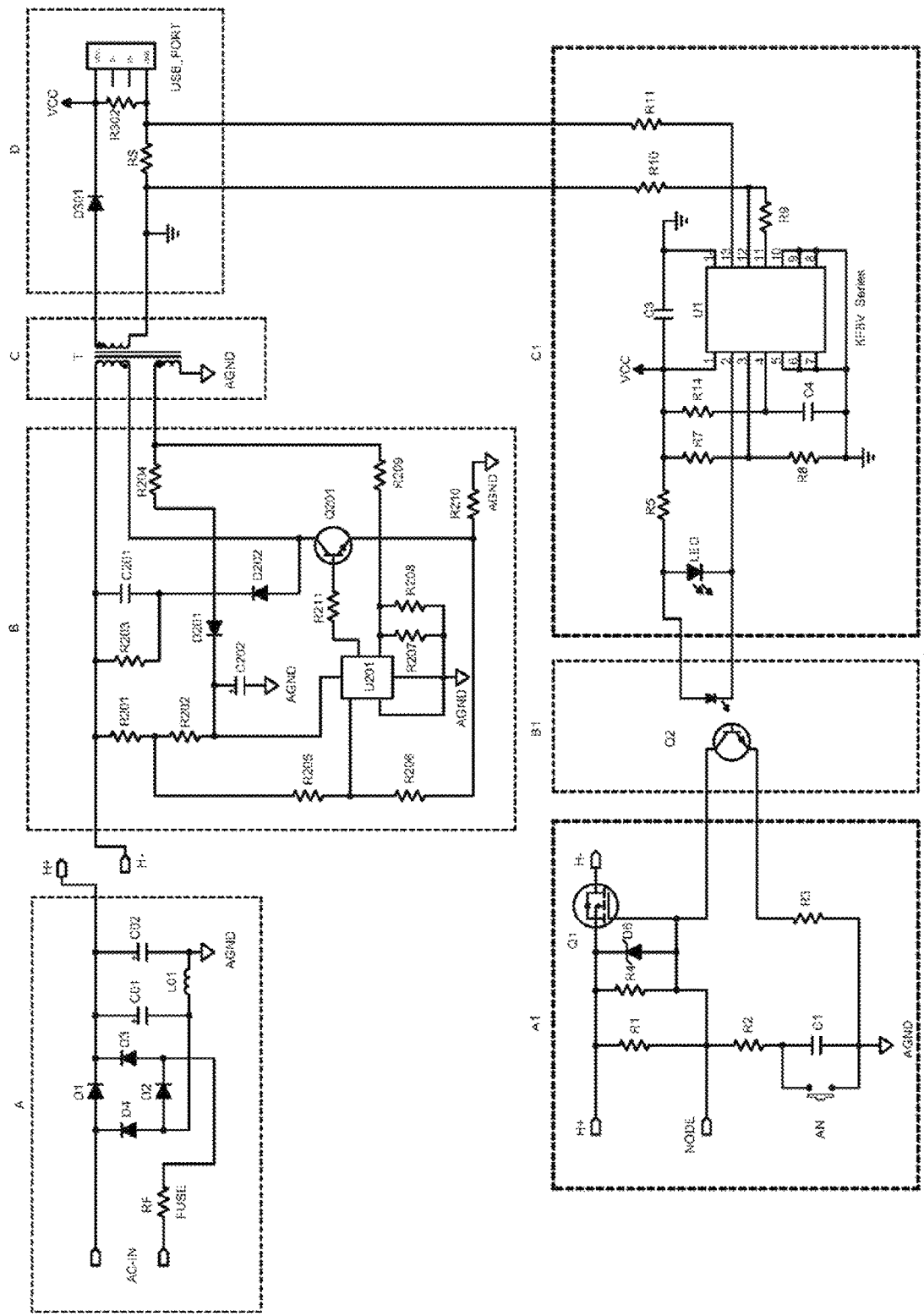
FIG. 6 is a circuit diagram illustrating that the electronic switch is connected in series in the positive output line and the low-voltage-end control detection circuit includes the central processing unit.

In practice, after the charger is powered off for protection, if recharging is required or other electronic products need to be charged, it is needed to completely disconnect the charger from the mains network and then connect the charger to the mains network again, so as to normally use the charging protection function. However, this requires frequent plug-in/out of the mains end of the charger. In order to reduce inconvenience caused by plugging in/out of the charger, and improve flexibility and convenience of the operation, a restart button is added. Referring to FIG. 2, FIG. 3. FIG. 5, and FIG. 6, a restart button AN is connected in parallel at the two ends of the first capacitor C1, and the restart button adopts a normally open button. After the charging protection is powered off, if the charging function needs to be restarted, it is not needed to disconnect the charger from the mains network (or socket); instead, it is only needed to press the start button AN to lift the power-off self-lock function (or state) of the charger, so that the charger can be restarted for normal use, which brings great convenience to the user.

Referring to the preferred embodiment shown in FIG. 3, the electronic switch Q1 in this example adopts a PMOS transistor and is connected in series in a positive output line of the bridge rectifier circuit; the power-on self-holding circuit includes a first resistor R1, a second resistor R2, and a first capacitor C1 that are connected in series between the positive output line and a negative output line of the bridge rectifier circuit, a connection point of the first resistor and the second resistor is connected to a gate of the electronic switch and a collector of the photoelectric coupler Q2, an emitter of the photoelectric coupler is connected to the negative output line of the bridge rectifier circuit through a third resistor R3, and a fourth resistor R4 and a voltage-stabilizing tube D6 are connected in parallel between the gate and a source of the electronic switch. A restart button AN is connected in parallel at the two ends of the first capacitor C1, and the restart button adopts a normally open button. At the beginning of power-on, according to the principle that a voltage between two ends of a capacitor cannot suddenly change, a voltage between two ends of the first capacitor C1 is 0, which is equivalent to that C1 is short-circuited, an alternating-current mains is rectified by the bridge rectifier circuit and then outputs a high-voltage direct-current voltage (the value of the high-voltage direct-current voltage is determined by the input alternating-current mains of 110 V to 220 V), the current flows through R1, R2, and C1, producing a divided voltage on R1 and R2, as compared with the point H+, the voltage division point NODE is of a negative voltage, the negative voltage is applied to the gate of Q1. Q1 is turned on, the switch control circuit and the high-frequency transformer at the rear end of Q1 obtain electricity, the low-voltage output circuit obtains electricity and outputs a charging current, and the low-voltage-end control detection circuit detects the charging current and causes the output end of the photoelectric coupler Q2 to be connected, a positive (H+) voltage of the bridge rectifier circuit is divided through R1, Q2, and R3, a negative voltage at a lower end (end NODE) of R1 is applied to the gate of Q1, the system forms a self-lock, Q1 is continuously on, and the charger continuously works. As time goes on, the voltage between the two ends of C1 gradually rises, the direct-current circuit is equivalently broken, the voltage between the point H+ and the node NODE is also lowered, at this time, the potential of the gate of Q1 depends on whether the output end of Q2 is connected, that is, depends on whether there is a charging current, and since the output end of Q2 is connected, the voltage between the two ends of C1 approximates 0. When there is a charging current (charging is performed), the output end of Q2 is connected, Q1 is turned on, the system forms a self-lock, and the charger continuously works; when there is no charging current (or the charging current is small, and the charging ends), Q2 cuts off, Q1 loses the turn-on condition and cuts off, the power-on self-holding circuit enters a power-off locked state, the switch control circuit, the high-frequency transformer, and the like cannot form a loop, the low-voltage output circuit loses electricity, and the current in the entire circuit is basically zero. Therefore, the standby power consumption is basically zero.

Referring to the embodiments shown in FIG. 2 and FIG. 3, a direct-current power source (VCC) and a ground used by the low-voltage-end control detection circuit are connected to an output end of the low-voltage output circuit, the low-voltage-end control detection circuit includes a current detection resistor RS, an amplifier AMP, and a comparator CMP that are connected in series in an output line of the low-voltage output circuit, two ends of the current detection resistor are respectively connected to an inverting input end and a non-inverting input end of the amplifier through a tenth resistor R10 and an eleventh resistor R11, a ninth resistor R9 is connected in series between an output end of the amplifier and the inverting input end of the amplifier, the output end of the amplifier is connected to an inverting input end of the comparator, a non-inverting input end of the comparator is connected to the direct-current power source through a seventh resistor R7 and is connected to the ground through an eighth resistor R8, the direct-current power source is connected to the input side of the photoelectric coupler Q2 through a fifth resistor R5, and a cathode of the photoelectric coupler is connected to an output end of the comparator; an indication light LED is connected forwardly between the anode and the cathode of the photoelectric coupler. The current detection resistor RS is connected in series in an output loop of the low-voltage output circuit, when there is a charging current, a voltage difference is produced between two ends of RS, the voltage is fed back to the amplifier AMP through R10 and R11 for amplification, an amplified signal is sent to the inverting input end of the comparator and compared with a preset value at the non-inverting end (the preset value is set by R7 and R8), the potential at the inverting end is greater than that at the non-inverting end, the comparator outputs a low-level signal to cause the output end of Q2 to be connected and then Q1 to turn on, the system enters a continuously turn-on locked state, and the charger continuously performs charging. When the battery of the load is fully charged and the charging current is zero or approximates zero, the voltage difference fed back by R10 and R11 is small, the potential at the inverting input end of the comparator is less than the preset potential at the non-inverting end, the output end of the comparator outputs a high level, so that the output end of Q2 is in a high-impedance state, the output cuts off, the system is unlocked, and then Q1 cuts off, the power-on self-holding circuit enters a power-off locked state, and the charger stops charging. In order to display the working state of the charger, an indication light LED is connected in parallel at the input side of the photoelectric coupler. When the charger performs charging operation, the indication light goes on; when the charger cuts off power, the indication light goes off.

The aforementioned design can normally work when the charger is connected first to the load and then to the mains, but cannot normally work when the charger is connected first to the mains and then to the load. This is because when the charger is first connected to the mains and not connected to the load, the charging current is zero, the system can only maintain a few seconds of work before the power-on self-holding circuit enters the power-off locked state, the charger is then connected to the load after power-off locking, the electronic switch will not restart for turn-on, and the charger will not start charging. Referring to FIG. 2 or FIG. 3, in order to eliminate the defect, a mechanical switch S1 is connected between the cathode at the input end of the photoelectric coupler Q2 and the ground, and the mechanical switch is mounted in an output socket of the charger. When no plug is inserted in the output socket of the charger, the mechanical switch turns on, a direct-current power source VCC is connected to the ground through R5, an input end of Q2, and S1 to form a closed loop, so that the connection of the output end of Q2 does not depend on whether there is a current in the charging loop and the charger is in a standby state, thereby solving the problem that the charger cannot restart because of no load at the rear end of the charger in the case that the charger is first connected to the mains and not connected to the load. At this time, when an electronic product such as a mobile phone or an electric bicycle is inserted in the output socket of the charger for charging, the mechanical switch synchronously turns off, and afterwards the turn-on of Q2 only depends on whether there is a charging current in the circuit, and the system enters the normal feedback control mode.

Figure 4:
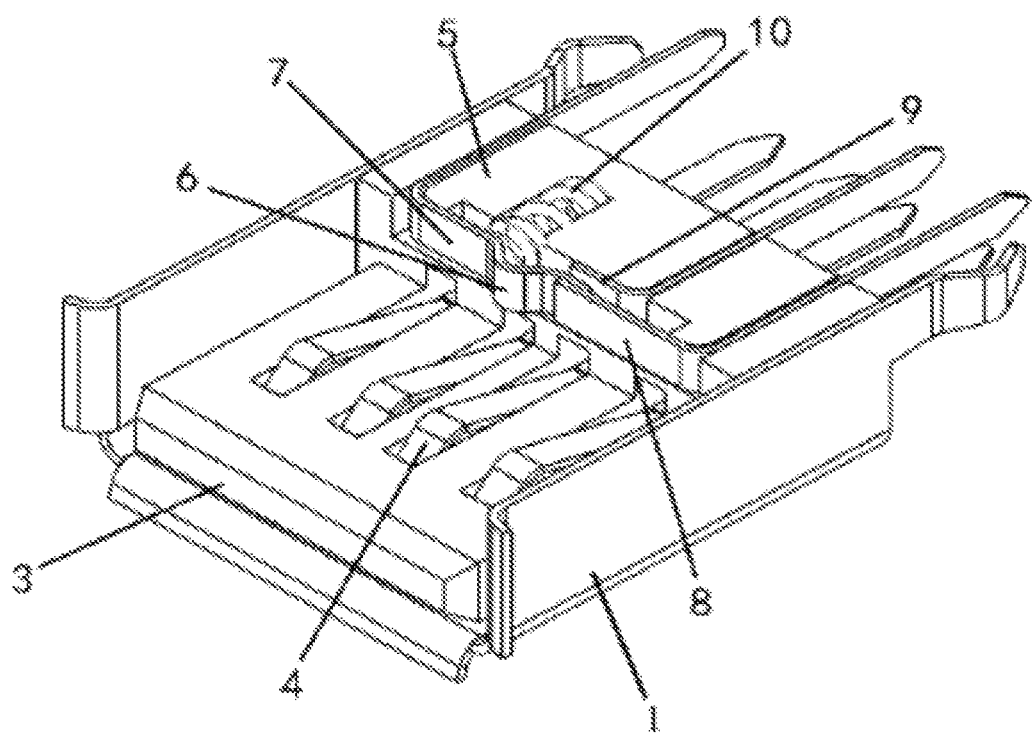
FIG. 4 is a sectional view of a USB female socket in the present invention.

The output socket of the charger adopts a USB female socket, the female socket includes a metal housing 1 for packaging and having an opening in a front part, a tongue-shaped fixing seat 3 of a plastic material mounted in the metal housing, and metal pins 4 embedded in the fixing seat, a boss 5 of a plastic material is provided in a rear part of the fixing seat, a recess is provided in the boss, the mechanical switch is embedded in the recess, a button portion 6 of the switch protrudes above the metal pins from the inside of the boss, and when a USB plug is inserted into the USB female socket, a front end of the USB plug can touch the button portion to trigger the mechanical switch. Referring to FIG. 4, the mechanical switch includes a bar-shaped movable arm 7, a first bar-shaped static arm 8, and a second bar-shaped static arm 9, the movable arm and the first and second static arms are arranged facing each other on left and right sides and are perpendicular to the insertion direction of the USB plug, a middle part of the movable arm protrudes above the metal pins 4 to form the button portion 6; when the USB plug is not inserted, the end part of the movable arm and the end part of the first static arm are lap-jointed to form a normally closed switch, and the end part of the movable arm and the end part of the second static arm form a normally open switch; when the USB plug is inserted, the front end of the USB plug touches the button portion, the end part of the movable arm and the end part of the first static arm are separated, and the end part of the movable arm and the end part of the second static arm are lap-jointed, so that the normally closed switch is turned off and meanwhile the normally open switch is turned on; extending pins of the movable arm and the first and second static arms as well as extending pins of the metal pins 4 extend from the rear end of the metal housing 1 at an angle of 180° or extend from the rear sidewall of the metal housing at an angle of 90°. A reset spring 10 is provided between an inner surface of the movable arm 7 away from the opening of the metal housing 1 and the boss 5. When the USB plug is inserted into the USB female socket, the button portion 6 is pressed by the front end of the USB plug to displace inwardly, and then the switch is triggered. In this embodiment, just the normally closed switch is used.

The USB female socket disclosed in the present invention has been filed separately for a patent at the same time.

In the embodiments shown in FIG. 5 and FIG. 6, a direct-current power source (VCC) and a ground used by the low-voltage-end control detection circuit are connected to an output end of the low-voltage output circuit, the low-voltage-end control detection circuit includes a voltage detection unit, a current detection unit, and a central processing unit U1 (the central processing unit may adopt a single-chip microcomputer KF8V series), the direct-current power source is connected to an anode at the input side of the photoelectric coupler Q2 through a fifth resistor R5, and a cathode at the input side of the photoelectric coupler is connected to the central processing unit, where the voltage detection unit includes a seventh resistor R7 and an eighth resistor R8 that are connected between the direct-current power source and the ground, and a connection point of the seventh and eighth resistors sends a detected voltage signal (a voltage at the low-voltage output end is detected) to the central processing unit; the current detection unit includes a current detection resistor RS connected in series in an output line of the low-voltage output circuit, and two ends of the current detection resistor respectively send a detected current signal to the central processing unit through a tenth resistor R10 and an eleventh resistor R11. At the beginning of power-on, U1 controls the cathode at the input end of the photoelectric coupler to be at a low level. When the system is not connected to a load or detects a no-charging state within a period of time from the initial power-on, the system automatically enters a power-off protected state to avoid standby power consumption, realize the no-load power-off protection function and then achieve the purpose of saving energy. During charging, a charging current flows through RS, produces a voltage difference between two ends of RS, the voltage difference is processed by a circuit inside the central processing unit, and whether the charging ends is judged according to the voltage signal. When the charging does not end (RS has a current flowing therethrough and has a voltage difference between two ends thereof), the central processing unit sends a low level to the cathode at the input side of the photoelectric coupler after analysis and processing, the photoelectric coupler Q2 is turned on, and the charger continuously performs charging. When the charging ends (no current flows through the RS, and the voltage difference between two ends of RS is zero), the central processing unit sends a high level to the cathode at the input side of the photoelectric coupler after analysis and processing, the photoelectric coupler Q2 is turned off, the power-on self-holding circuit enters a power-off locked state, Q1 is turned off, the switch control circuit, the high-frequency transformer, and the like cannot form a loop, the low-voltage output circuit loses electricity, and the current in the entire circuit is basically zero. The central processing unit detects an output voltage through the voltage detection unit, if the charger has an internal failure to cause an excessively high output voltage, the central processing unit controls an overvoltage protection function to be enabled and controls the photoelectric coupler Q2 to turn off, the power-on self-holding circuit enters a power-off locked state, and Q1 is turned off, thereby implementing the overvoltage protection function. Similarly, when the charging current is excessively large (or the load is under an overcurrent), the central processing unit controls an overcurrent protection function to be enabled and sends a high level to the cathode at the input side of the photoelectric coupler, the photoelectric coupler Q2 is turned off, the power-on self-holding circuit enters a power-off locked state, and Q1 is turned off, thereby implementing the overcurrent protection function.

In a preferred embodiment, the central processing unit U1 acquires a maximum safe charging current Iconstant in the constant current charging stage according to the current signal, and calculates a charging cut-off current threshold Icut-off according to Iconstant in combination with an output voltage level of the voltage signal through the formula: Icut-off=Iconstant/N. N in the formula is a charging parameter, the charging parameter has multiple values corresponding to the output voltage level, the charging parameter is stored in a storage of the central processing unit, the value of N is correspondingly called during formula calculation, the central processing unit monitors a charging current in the constant voltage stage in real time through the current detection unit, and when the charging current is lower than the charging cut-off current threshold, the photoelectric coupler Q2 is controlled to turn off after a period of delay. The power-on self-holding circuit enters a power-off locked state, and Q1 is turned off, thereby implementing overcharge and undercharge protection. The aforementioned formula may also be written as Icut-off=Iconstant*1/N, and Iconstant may also be written as Iconstant (CC).

The above embodiments are only for illustration, not for limitation. Any equivalent modifications or alternations to the present application without departing from the spirit and scope of the present application should fall within the scope of the claims of the present application.

I claim:

1. A charger circuit of a charger, comprising
a bridge rectifier circuit,
a switch control circuit,
a high-frequency transformer,
a low-voltage output circuit;
a low-voltage-end control detection circuit;
an isolating drive circuit; and
a power-on self-holding circuit;
wherein the bridge rectifier circuit is connected to the switch control circuit;
the switch control circuit is connected to the high-frequency transformer;

the high-frequency transformer is connected to the low-voltage output circuit;
the low-voltage output circuit is connected to the low-voltage-end control detection circuit;
the low-voltage-end control detection circuit is connected to the isolating drive circuit;
the isolating drive circuit is connected to the power-on self-holding circuit; and
the power-on self-holding circuit is connected to a gate of an electronic switch (Q1), wherein the electronic switch is connected between the bridge rectifier circuit and the switch control circuit;
wherein the low-voltage-end control detection circuit is configured for feeding back a magnitude of an output current of the charger and outputting a control signal according to the magnitude of the output current;
the isolating drive circuit is configured for isolating the control signal from the low-voltage-end control detection circuit;
the power-on self-holding circuit is configured for controlling on and off of the electronic switch (Q1) according to the control signal isolated by the isolating drive circuit; and
the power-on self-holding circuit is further configured for providing a short-time ON level to the gate of the electronic switch (Q1) at the beginning of power-on of the charger so as to turn on the electronic switch;
wherein the isolating drive circuit comprises a photoelectric coupler (Q2), an input side of the photoelectric coupler is connected to the low-voltage-end control detection circuit, and an output side of the photoelectric coupler is connected to the power-on self-holding circuit;
the electronic switch (Q1) is an NMOS transistor or a PMOS transistor;
when the electronic switch (Q1) is the NMOS transistor, a source of the NMOS transistor is connected to a negative output line (AGND) of the bridge rectifier circuit, and a drain of the NMOS transistor is connected to a ground (CHGND) of the switch control circuit: the power-on self-holding circuit is connected to the gate of the NMOS transistor:
the power-on self-holding circuit comprises a first resistor (R1), a first capacitor (C1), and a second resistor (R2);
the first resistor is connected to a first end of the first capacitor, and the second resistor is connected to a second end of the first capacitor;
the first capacitor is connected to in parallel with a series combination of a third resistor (R3) and the photoelectric coupler (Q2);
the power-on self-holding circuit is connected between a positive output line and the negative output line of the bridge rectifier circuit;
the third resistor (R3) is connected in series between a first connection point and a collector of the photoelectric coupler; wherein the first connection point is located between the first resistor and the first end of the first capacitor;
a second connection point, which is located between the second end of the first capacitor and the second resistor, is connected to an emitter of the photoelectric coupler and the gate of the electronic switch (Q1);
a fourth resistor (R4) and a Zener diode (D6) are connected in parallel between the gate and the source of the electronic switch;

a restart button (AN) is connected in parallel at the first end and the second end of the first capacitor (C1); the restart button comprises a normally open button;

when the electronic switch (Q1) is the PMOS transistor, a source of the PMOS transistor is connected to a positive output line of the bridge rectifier circuit, and a drain of the PMOS transistor is connected to a ground of the switch control circuit;

the power-on self-holding circuit comprises a first resistor (R1), a second resistor (R2), and a first capacitor (C1) that are connected in series between the positive output line and a negative output line of the bridge rectifier circuit;

a third connection point located between the first resistor and the second resistor is connected to a gate of the electronic switch and a collector of the photoelectric coupler (Q2);

an emitter of the photoelectric coupler is connected to the negative output line of the bridge rectifier circuit through a third resistor (R3); and a fourth resistor (R4) and a Zener diode (D6) are connected in parallel between the gate and the source of the electronic switch;

a restart button (AN) is connected in parallel at two ends of the first capacitor (C1), and the restart button comprises a normally open button.

2. The charger circuit according to claim 1, wherein a direct-current power source and a ground used by the low-voltage-end control detection circuit are respectively connected to an output end of the low-voltage output circuit; the low-voltage-end control detection circuit comprises a current detection resistor (RS), an amplifier (AMP), and a comparator (CMP) that are sequentially connected in an output line of the low-voltage output circuit, two ends of the current detection resistor are respectively connected to an inverting input end and a non-inverting input end of the amplifier through a tenth resistor (R10) and an eleventh resistor (R11), a ninth resistor (R9) is connected in series between an output end of the amplifier and the inverting input end of the amplifier, the output end of the amplifier is connected to an inverting input end of the comparator, a non-inverting input end of the comparator is connected to the direct-current power source through a seventh resistor (R7) and is connected to the ground through an eighth resistor (R8), the direct-current power source is connected to an anode at the input side of the photoelectric coupler (Q2) through a fifth resistor (R5), and a cathode at the input side of the photoelectric coupler is connected to an output end of the comparator, an indication light (LED) is connected forwardly between the anode and the cathode of the photoelectric coupler.

3. The charger circuit according to claim 2, wherein a mechanical switch (S1) is connected between the cathode of the photoelectric coupler (Q2) and the ground, the mechanical switch is mounted in an output socket of the charger, the mechanical switch is turned off when a plug is inserted in the socket, and the mechanical switch is turned on when there is no plug in the socket.

4. The charger circuit according to claim 3, wherein the output socket of the charger adopts a USB female socket, the female socket comprises a metal housing (1) for packaging and having an opening in a front part, a tongue-shaped fixing seat (3) of a plastic material mounted in the metal housing, and metal pins (4) embedded in the fixing seat, a boss (5) of a plastic material is provided in a rear part of the fixing seat, a recess is provided in the boss, the mechanical switch is embedded in the recess, a button portion (6) of the switch protrudes above the metal pins from the inside of the boss, and when a USB plug is inserted into the USB female socket, a front end of the USB plug is capable of touching the button portion to trigger the mechanical switch.

5. The charger circuit according to claim 1, wherein a direct-current power source and a ground used by the low-voltage-end control detection circuit are connected to an output end of the low-voltage output circuit, the low-voltage-end control detection circuit comprises a voltage detection unit, a current detection unit, and a central processing unit (U1), the direct-current power source is connected to an anode at the input side of the photoelectric coupler (Q2) through a fifth resistor (R5), and a cathode at the input side of the photoelectric coupler is connected to the central processing unit, wherein the voltage detection unit comprises a seventh resistor (R7) and an eighth resistor (R8) that are connected between the direct-current power source and the ground, and a connection point of the seventh and eighth resistors sends a detected voltage signal to the central processing unit; the current detection unit comprises a current detection resistor (RS) connected in series in an output line of the low-voltage output circuit, and two ends of the current detection resistor respectively send a detected current signal to the central processing unit through a tenth resistor (R10) and an eleventh resistor (R11); and the central processing unit judges whether charging ends according to the voltage signal and the current signal, and sends a control level for controlling on or off of the photoelectric coupler to the cathode at the input side of the photoelectric coupler.

6. The charger circuit according to claim 5, wherein the central processing unit (U1) acquires a maximum safe charging current $I_{constant}$ in the constant current charging stage according to the current signal, and calculates a charging cut-off current threshold $I_{cut-off}$ according to $I_{constant}$ in combination with an output voltage level of the voltage signal through the formula: $I_{cut-off}=I_{constant}/N$, N in the formula is a charging parameter, the charging parameter has multiple values corresponding to the output voltage level, the charging parameter is stored in a storage of the central processing unit, the value of N is correspondingly called during formula calculation, the central processing unit monitors a charging current in the constant voltage stage in real time through the current detection unit, and when the charging current is lower than the charging cut-off current threshold, the photoelectric coupler (Q2) is controlled to cut off after a period of delay.

* * * * *